(12) United States Patent
Harmer

(10) Patent No.: US 6,697,207 B2
(45) Date of Patent: Feb. 24, 2004

(54) METHOD AND CIRCUIT FOR PROVIDING VELOCITY-CONTROLLED HEAD LOADING OR UNLOADING

(75) Inventor: Brent Jay Harmer, West Point, UT (US)

(73) Assignee: Iomega Corporation, San Diego, CA (US)

( * ) Notice: Subject to any disclaimer, the term of this patent is extended or adjusted under 35 U.S.C. 154(b) by 306 days.

(21) Appl. No.: 09/887,498

(22) Filed: Jun. 22, 2001

(65) Prior Publication Data

US 2002/0196575 A1 Dec. 26, 2002

(51) Int. Cl.[7] .............................................. G11B 21/02
(52) U.S. Cl. ........................ 360/75; 360/61; 360/78.06
(58) Field of Search ................................ 360/75, 77.04, 360/61, 78.06; 318/561

(56) References Cited

U.S. PATENT DOCUMENTS

| | | | |
|---|---|---|---|
| 5,084,791 A | 1/1992 | Thanos et al. | 360/77.04 |
| 5,615,064 A | 3/1997 | Blank et al. | 360/75 |
| 5,825,571 A | * 10/1998 | Sandusky et al. | 360/67 |

* cited by examiner

*Primary Examiner*—David Hudspeth
*Assistant Examiner*—Mitchell Slavitt
(74) *Attorney, Agent, or Firm*—Woodcock Washburn LLP

(57) ABSTRACT

A method and apparatus are provided for closed loop control of head load velocity in rotating media mass storage applications. A novel pulsed current velocity controlled head load/unload circuit is provided that uses the back EMF analog signal to modulate pulse amplitude. A system is thus provided having amplitude modulation of a fixed period current pulse train via back EMF feedback, whereby there is no need to monitor back EMF via A/D conversion circuitry.

25 Claims, 9 Drawing Sheets

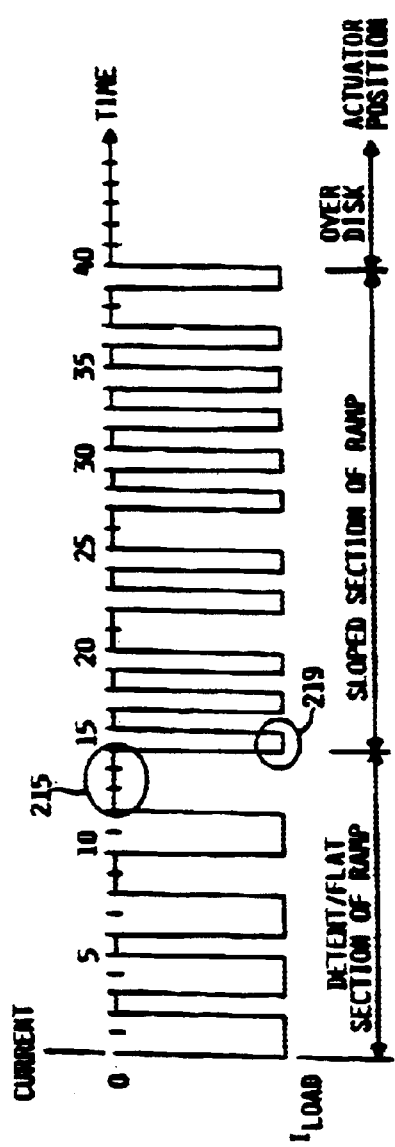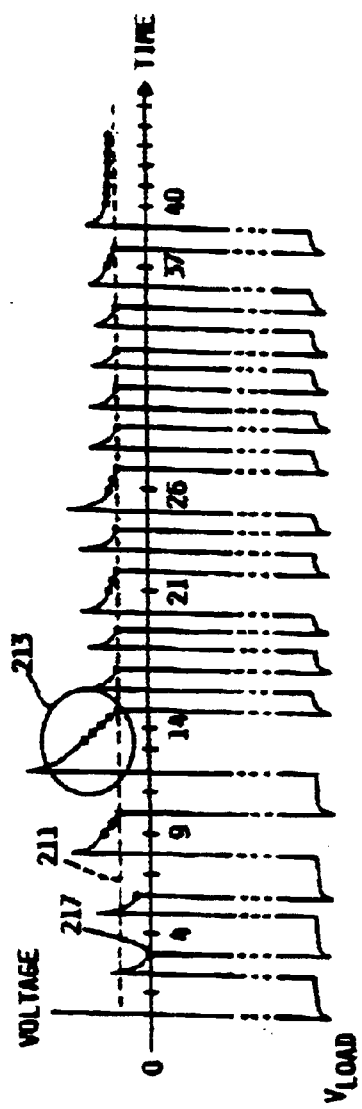
FIGURE 2A PRIOR ART
FIGURE 2B PRIOR ART

METHOD AND CIRCUIT FOR PROVIDING VELOCITY-CONTROLLED HEAD LOADING OR UNLOADING

FIELD OF THE INVENTION

The present invention relates to data storage devices having actuators, and more specifically, to integrated circuit technology and a method for providing closed loop self-contained control of head load/unload velocity in rotating media mass storage applications.

BACKGROUND OF THE INVENTION

Data storage devices, and in particular, data storage devices of the type that accept a removable cartridge containing a disk-shaped storage medium, usually employ either a linear actuator mechanism or a rotary arm actuator mechanism for positioning the read/write head(s) of the disk drive over successive tracks of the disk-shaped storage medium. In most disk drives, and particularly in those that receive removable disk cartridges, the linear or rotary arm actuators are moved to a retracted, or parked position when the disk drive is not in use. In such a retracted position, the read/write heads of the disk drive are moved off and away from the surface(s) of the storage medium in order to prevent damage to the head(s) and storage medium. In order to resume use of the disk drive, the read/write heads must once again be loaded onto the surface(s) of the storage medium so that the data transfer can begin. It is important that the head loading operation be carried out in a controlled manner to prevent damage to the read/write heads.

Some magnetic storage devices support a head loading velocity control mechanism for a disk drive that measures the back EMF voltage across the actuator of the disk drive to obtain an indication of the velocity of the actuator. The measured back EMF voltage is then employed in a control scheme to control the velocity of the actuator during a head loading operation. Unfortunately, the circuitry needed to measure the back EMF voltage across the actuator increases the cost and complexity of the disk drive. Furthermore, this technique provides only a rough control of the actuator velocity, which may not be acceptable in many applications.

Comparatively, other magnetic storage devices utilize a velocity control technique for a disk drive actuator that employ thermal measurements to estimate the velocity of the actuator. Again, however, the circuitry necessary to obtain accurate thermal measurements unduly increases the cost of the disk drive, and this technique is susceptible to inaccuracies.

Further yet, some devices employ high-precision glass scales affixed to a disk drive actuator for obtaining accurate position and track counting information during track seek operations. See, e.g., Thanos et al., U.S. Pat. No. 5,084,791. Unfortunately, the cost and complexity of the high-precision glass scales and associated optical circuitry make them disadvantageous. Certain products in the "BETA" line of Bernoulli disk drives manufactured by Iomega Corporation, the assignee of the present invention, employ an optical sensor and a gray-scale pattern affixed to a linear drive actuator to obtain an indication of the linear position of the actuator. However, these products do not, and are not capable of, deriving or controlling the velocity of the actuator using the position information generated with the gray-scale pattern and optical sensor.

U.S. Pat. No. 5,615,064, to Blank et al. discloses a digital storage system in which a flying read/write head is loaded onto the surface of moving storage media with controlled velocity to avoid contact with the surface of the storage media. Head load velocity is detected by measuring the back EMF generated by the head arm actuator. Improved control and accuracy is obtained by breaking up the head arm actuator drive power into a series of pulses and measuring the back EMF induced into the low impedance voice coil of the head arm actuator in between pulses but only after the actuator current has been reduced to substantially zero in order to avoid interference by actuator current induced voltages.

FIG. 1 is a schematic diagram of the voice coil motor driving circuit and a block diagram of the control, as taught by Blank et al. The current is driven through the voice coil 119 by transistors pairs 111–113 to move the actuator arm in one direction, and by 115–117 to move the arm in the other direction. When transistors 111 and 113 are turned on, current flows from the positive terminal of the power supply, down through transistor 111, through the voice coil in a first direction from terminal 127 to terminal 129, and out through transistor 113 to the negative terminal of the power supply. When transistors 115 and 117 are turned on, current flows from the positive terminal of the power supply, down through transistor 115, through the voice coil in a second direction from terminal 129 to terminal 127, and out through transistor 117 to the negative terminal of the power supply. In this way, current can be made to flow in either direction through the voice coil, and move the actuator arm in either direction. When all four transistors 111–117 are driven such that the current in the coil decays to zero, no voltage drops occur across the coil due to resistance.

The only significant voltage across the coil 119 is due to the back EMF generated by motion of the coil through the field magnet of the motor, although there may be some voltage due to leakage currents from the drive amplifiers. This back EMF is proportional to the velocity of the motion of the arm. The EMF is amplified by amplifier 121, and fed to the control processor 123. Control processor 123 includes an analog to digital (A/D) converter for converting the analog amplified EMF from amplifier 121 to digital signals for processing according to programmed instructions in a program memory. When low EMF signals are present, the processor 123 determines that the arm 27 is moving at a low velocity, and processor 123 signals the drive circuits 125 to which processor 123 is connected to once again drive current through the coil 119 in the direction to increase the velocity of arm 27. After a calculated on-time of this drive current, the processor 123 again signals the drive circuits 125 to turn off the current to coil 119 so that a clear EMF signal can thereafter be measured, to thereby determine the velocity of arm 27 after the calculated on-time of the above-mentioned drive current. The circuit of FIG. 1 continues to operate until a signal is received in the read head from the disk that indicates that the head has been loaded onto the disk. If the head is being unloaded from the disk, the current is driven through the voice coil in the opposite direction until the arm comes to rest in the detent 19 causing the EMF to go to zero.

Referring now to FIGS. 2A and 2B, further operation of the circuit of Blank et al. is described. The drive current waveform is shown on top in FIG. 2A, and the combined drive voltage and back EMF waveform is shown below in FIG. 2B. These waveforms are generated by the control processor 123 using a simple threshold algorithm. In this regard, Blank et al. teaches to measure the actuator arm velocity using back EMF induced in the low impedance voice coil at times when drive current is not being applied.

Because the drive voltage is several orders of magnitude larger than the back EMF, the voltage scale of the lower portion of the waveform of FIG. 2B is broken in the middle.

The first drive current pulse, which starts at time zero and continues until time two of FIG. 2A, provides torque at the voice coil to initiate movement of the actuator arm from its rest position. This drive current pulse is about five hundred microseconds. At time two, the current is turned off and the current is allowed to decay for about 200 microseconds so that back EMF can be measured without interference by the drive current voltage drop. As seen in the top part of the lower waveform, the back EMF has not yet reached the threshold 211 and, in fact, goes to zero just as EMF is measured at sample 217. As soon as the EMF is measured and found to be below threshold 211, the next current pulse starts at time three. Zero EMF indicates that velocity also went to zero, but also that the actuator arm has been moved out of the detent and is on a flat section of a ramp. Accelerating torque is applied by the voice coil between times three and five resulting in a velocity and proportional back EMF that nearly reaches the threshold 211, and does not decay all the way to zero by time six when the EMF is again measured and used by the control processor to apply the third drive current pulse.

At the end of the third drive current pulse, the back EMF and the proportional velocity of the actuator arm has exceeded threshold 211, and they remain above the threshold for two samples but they have already decayed to a level at or below the threshold 211 by the third sample which occurs at time ten. Accordingly another wide drive current pulse is provided beginning at time ten. This fourth pulse accelerates the arm to a velocity indicated by the back EMF signal 213 to be well above the threshold 211 during zero current time 215, and the back EMF does not decay to or below the threshold until the fifth EMF sample is taken at time fifteen. This larger velocity decay time indicates that the EMF voltage was adequately above the threshold so as to allow the process to determine that such powerful wide current pulses are no longer needed to keep the arm moving at the target load velocity and the control processor hereafter applies shorter drive current pulses of about two hundred fifty microseconds as indicated at 219.

It will be noted that during these off times, eight to ten and twelve to fifteen, the back EMF decays rather fast, as indicated by the relatively steep slope of the decay of the back EMF. This phenomenon is caused by the relatively higher friction of a tang portion on the flat portion of the ramp. As the tang portion passes the transition to the sloped section of the ramp, the back EMF decay becomes more gradual due to a reduced normal component of load force and, therefore, reduced friction, and in some cases a contribution of potential energy as the tang portion goes down the sloped section of the ramp.

Continuing at time fifteen, when the back EMF has now dropped to below the threshold 211, another drive current pulse is applied by control processor 123, but now a shorter pulse width is employed as the current turns off at time sixteen. This shorter pulse provides a shorter acceleration time and a lower end velocity at time sixteen. These steps are repeated between times seventeen and nineteen. The seventh drive current pulse in FIG. 2A has raised the velocity such that the back EMF does not decay to the threshold by time twenty-one and, therefore, more samples are taken until time twenty two.

The above-described process steps of Blank et al. are repeated as the actuator arm moves the tang portion down the slope of the ramp at a velocity that is controlled by the process to be near the threshold as measured by the back EMF. As the tang portion leaves the slope and the head begins to fly out over the disk, the tang portion to ramp component of friction disappears and, therefore, back EMF decay is much more gradual. Accordingly, at time forty, the back EMF is still above the threshold 211 when signals begin to be received from the read/write head, and actuator arm drive current control is accomplished using feedback from the disk media as is known in the prior art.

The unloading of the head from the disk media to the detent position is accomplished in a similar manner using a drive current of opposite polarity. Accordingly, the waveforms shown in FIGS. 2A and 2B will both be inverted during head unload from those shown, but the sequence of pulses is similar. Signals from the read/write head may be used to determine when the head has approached the ramp. Several consecutive current pulses followed by near zero back EMF indicate to control processor 123 that the head has been unloaded.

However, as illustrated in FIG. 1, Blank et al. requires Analog to Digital (A/D) conversion of the back EMF signal. Additionally, as illustrated in the waveforms of FIGS. 2A and 2B, Blank et al. teaches the application of a variable width pulse train as the actuator travels from the detent the flat portion of the ramp, to the slope section, etc. to load the heads, and vice versa for unloading the heads. In other words, Blank et al. requires control circuitry for generating a pulse train having different pulse widths at different times. Both A/D circuitry and the additional control circuitry for variable pulse widths add to the expense of the control loop, and consequently, Blank et al. does not teach a system having amplitude modulation of a fixed period current pulse train via back EMF feedback, whereby there is no need for A/D circuitry to monitor the back EMF.

In view of the foregoing, there exists a need for a data storage drive having the ability to process back EMF originating from the actuator coil during zero commanded current to reduce the amplitude of the commanded current pulse train and thereby control the velocity during head load. There further exists a need for an improved method that uses the analog back EMF signal to modulate pulse amplitude to control pulsed current velocity during a head load/unload process. There still further exists a need for such a system wherein there is no need to monitor back EMF as a result of a self-contained analog control circuit.

SUMMARY OF THE INVENTION

The present invention provides a method and apparatus for providing closed loop control of head load velocity in rotating media mass storage applications. A novel pulsed current velocity controlled head load/unload circuit is provided that uses the back EMF analog signal to modulate pulse amplitude. The invention provides a system having amplitude modulation of a fixed period current pulse train via back EMF feedback, whereby there is no need to monitor back EMF via A/D conversion circuitry.

Additional features and advantages of the present invention will become evident from the below description of the invention.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings:

FIGS. 2A and 2B show the drive current waveform and drive voltage plus back EMF waveform as controlled and processed by the prior art circuit of FIG. 1;

DETAILED DESCRIPTION OF THE INVENTION

Overview:

Modem hard disk drives comprise one or more rigid disks that are coated with a magnetizable medium and mounted on the hub of a spindle motor for rotation at a constant high speed. Information is stored on the disks in a plurality of concentric circular tracks by an array of transducers ("heads") mounted to a rotary actuator for movement of the heads relative to the disks.

The heads are mounted via flexures at the ends of a plurality of arms that project radially outward from a substantially cylindrical actuator body. The actuator body pivots about a shaft mounted to the disk drive housing at a position closely adjacent the outer extreme of the disks. The pivot shaft is parallel with the axis of rotation of the spindle motor and the disks so that the heads move in a plane parallel with the surfaces of the disks.

Typically, the actuator employs a voice coil motor to position the heads with respect to the disk surfaces. The actuator voice coil motor includes a coil mounted on the side of the actuator body opposite the head arms so as to be immersed in the magnetic field of an array of permanent magnets. When controlled DC current is passed through the coil, an electromagnetic field is set up which interacts with the magnetic field of the permanent magnets and causes the coil to move relative to the permanent magnets in accordance with the well-known Lorentz relationship. As the coil moves relative to the permanent magnets, the actuator body pivots about the pivot shaft and the heads are moved across the disk surfaces.

The heads are supported over the disks by actuator slider assemblies that include air-bearing surfaces designed to interact with a thin layer of moving air generated by the rotation of the disks, so that the heads are said to "fly" over the disk surfaces. Generally, the heads write data to a selected data track on the disk surface by selectively magnetizing portions of the data track through the application of a time-varying write current to the head. In order to subsequently read back the data stored on the data track, the head detects flux transitions in the magnetic fields of the data track and converts these to a signal which is decoded by read channel circuitry of the disk drive.

As track densities and rotational speeds of modern disk drives continue to increase, closed-loop control of head position becomes increasingly critical to ensure reliable performance of the drives. Additionally, this makes the process of loading and unloading the heads accurately, quickly and inexpensively all the more critical. Thus, there is a continual need for improved approaches to loading and unloading the heads through controlled modulation of a pulse train.

Exemplary Operating Environment for the Invention

Figure 1:
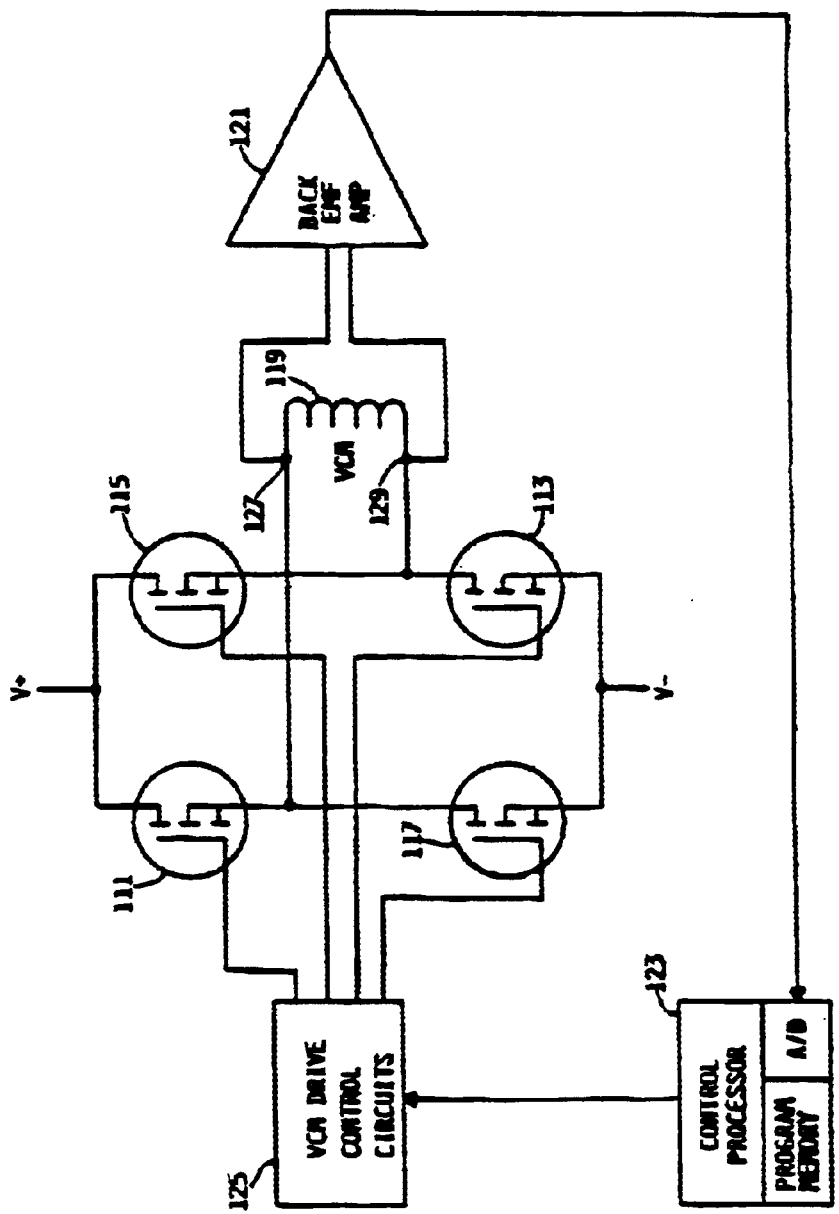
FIG. 1 is a diagram of a prior art actuator drive circuit and associated control blocks.
Figure 3:
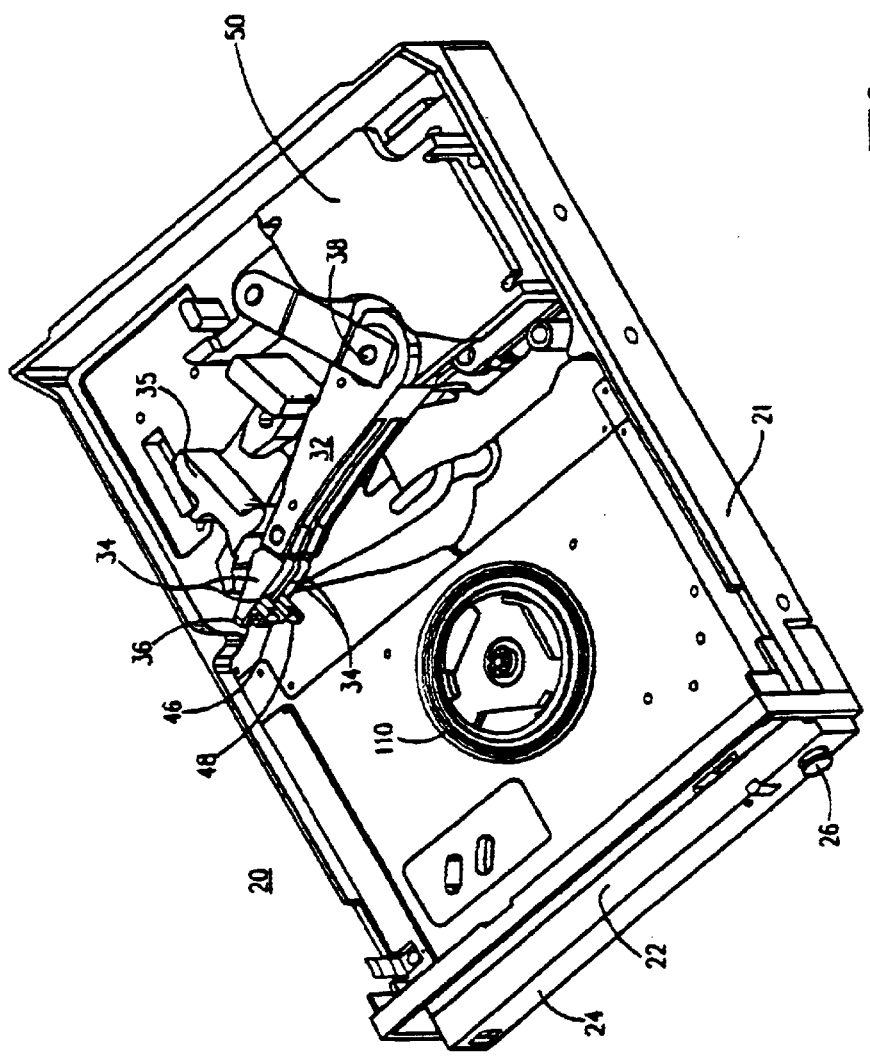
FIG. 3 is a perspective view of an exemplary data storage device, or disk drive, in which the present invention may be employed.

Referring to the drawings wherein like numerals indicate like elements throughout, there is shown in FIG. 3 an exemplary data storage device 20, or disk drive, in which the present invention may be employed. The exemplary disk drive 20 is of the type that receives a removable disk cartridge, however, the present invention is by no means limited thereto. For example, the present invention can also be employed in a fixed-disk type drive, or any device that implicates accurate actuator control.

As shown in FIG. 3, the exemplary disk drive 20 comprises a chassis 21 on which a number of disk drive components are mounted. A front panel 24 of the disk drive 20 has a substantially horizontal opening 22 for receiving a removable disk. An eject button 26 is provided on the front panel for ejecting a disk cartridge from the disk drive 20. A spindle motor 110 is mounted on the chassis 21 to provide a means for rotating the storage media within a disk cartridge.

An actuator arm 32, which forms part of a rotary arm voice coil actuator, is pivotally mounted to the drive chassis 21 at 38. The actuator arm 32 has a plurality of suspension arms 34 at its distal end that each carry a respective read/write head 36 for recording to and reading information from the surfaces of the storage media of a disk cartridge. A head loading mechanism 35 facilitates loading of the magnetic heads onto the storage media. The head loading mechanism comprises a pair of load ramp structures 46, 48 upon which the suspension arms 34 of the actuator arm 32 ride during head loading/unloading operations.

Figure 5:
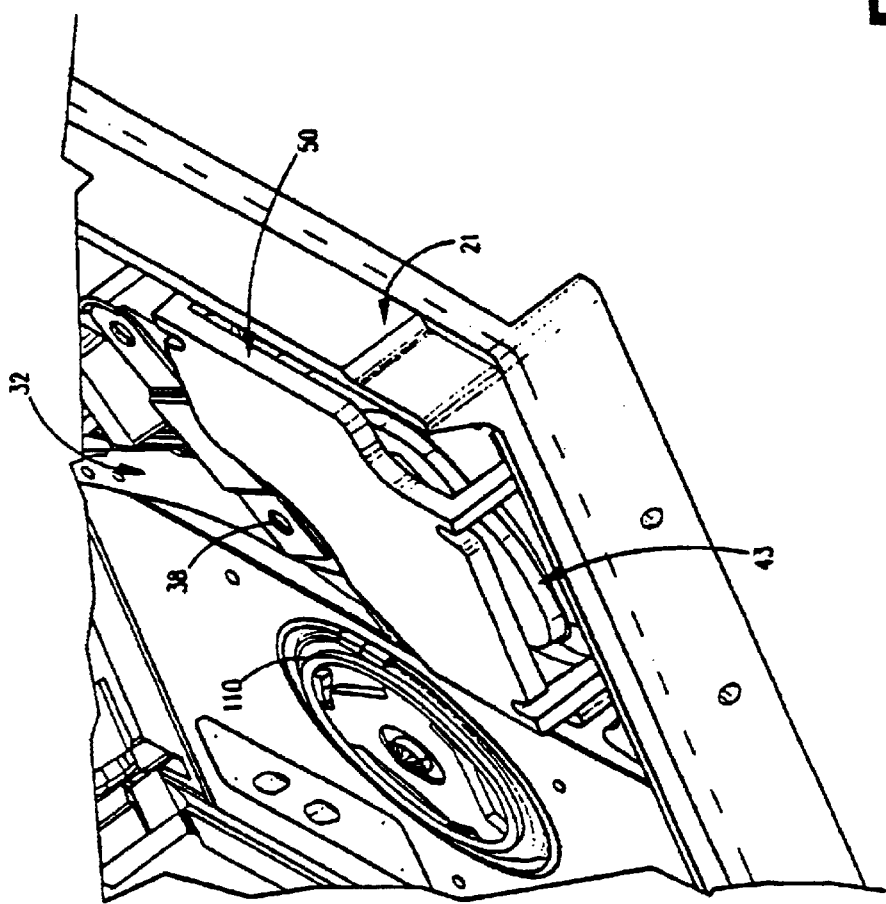
FIG. 5 is a perspective view of a portion of the exemplary disk drive of FIG. 3.
Figure 6:
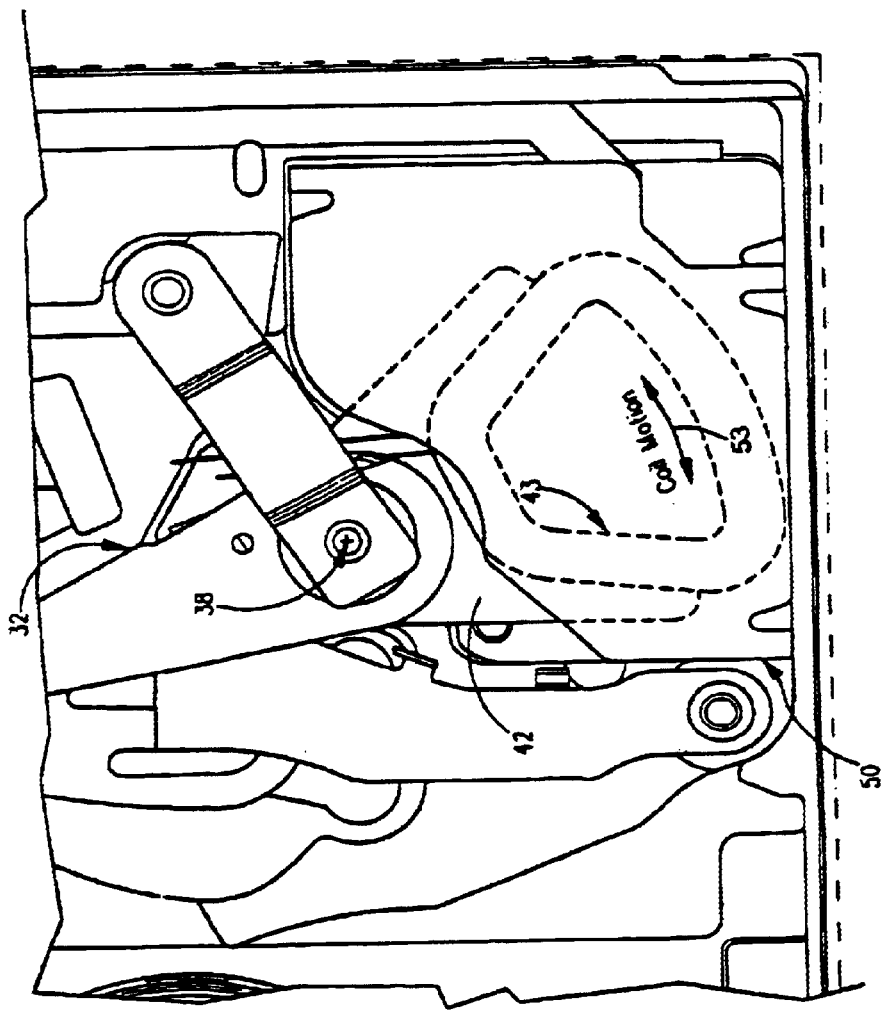
FIG. 6 is a plan view of the portion of the disk drive illustrated in FIG. 5.

Further details concerning a head loading mechanism of the type shown at 35 can be found U.S. patent application Ser. No. 08/438,254, entitled "Head Loading Mechanism for a Disk Drive," filed May 10, 1995, which is incorporated herein by reference in its entirety. An exemplary voice coil element 43 is illustrated in FIGS. 5 and 6. Voice coil element 43 is affixed to a forked member 42 at the other end of the actuator arm 32 for controlling the rotational movement of the arm 32. A magnet return path assembly 50 is mounted to the chassis 21 and provides a magnet return path for the voice coil element 43. The motion of the coil is depicted along path 53. The motion of the coil relative to the magnet return path assembly 50 forms the basis of the back EMF signal measured, interpreted and/or processed by the present invention for the purpose of controlling the position of the head(s) 36.

Figure 4:
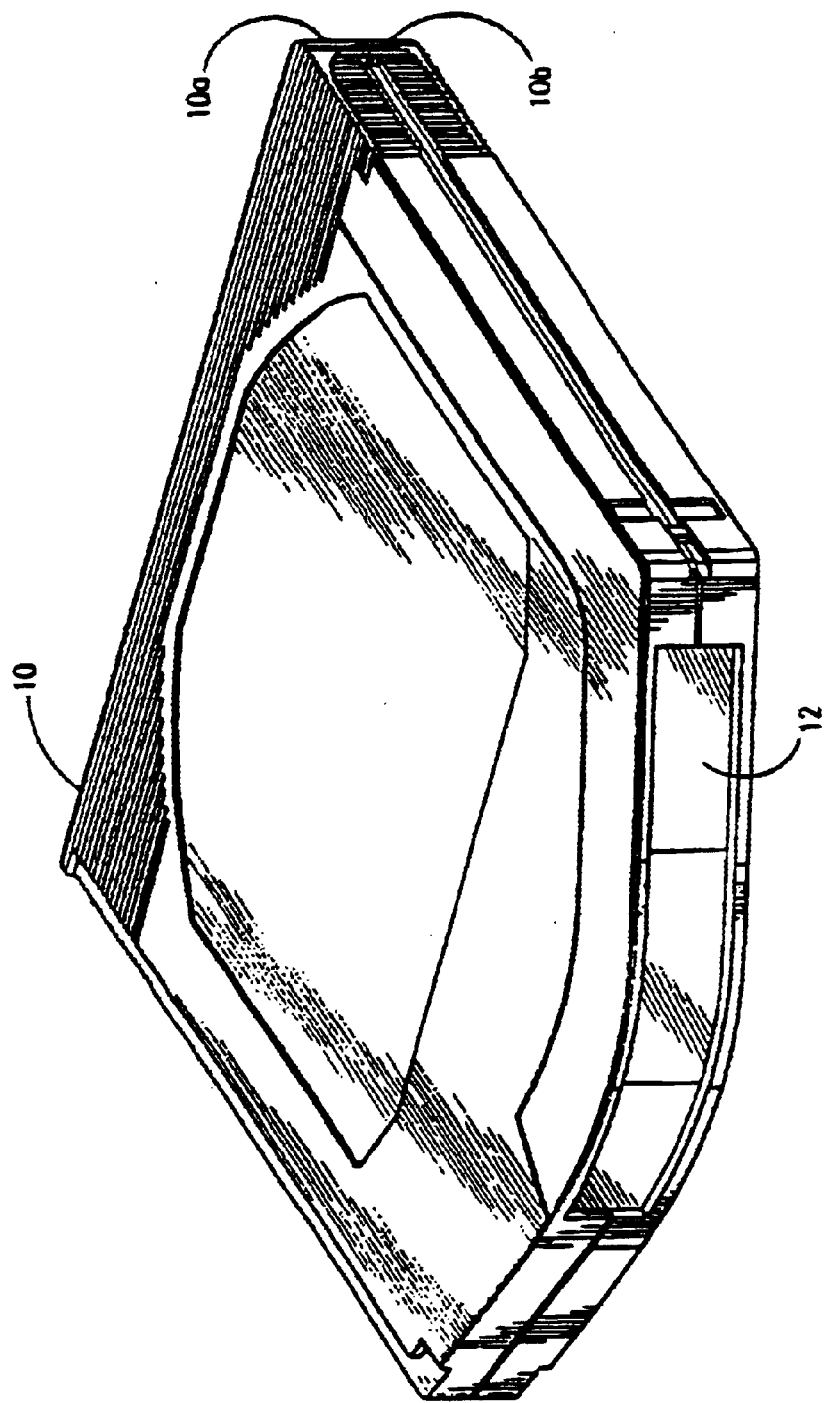
FIG. 4 is a perspective view of an exemplary removable storage medium, such as a disk cartridge, for use in connection with the disk drive of FIG. 3.

FIG. 4 is a perspective view of a disk cartridge 10 that may be used with the removable cartridge disk drive 20 of FIG. 3. The disk cartridge 10 comprises an outer casing consisting of upper and lower shells 10a, 10b, respectively.

Preferably, the upper and lower shells 10a, 10b are formed of a rigid plastic material. A door 12 on the casing provides access to the recording disks by the read/write heads of a disk drive. In the present embodiment, the storage media comprise rigid magnetic media, however, other storage media may be employed, such as flexible magnetic media or optical media. As described hereinafter in greater detail, when the disk cartridge 10 is inserted into the disk drive 20, the actuator arm 32 will rotate counter-clockwise (as viewed in FIG. 3) causing the suspension arms 34 of the actuator to move off the load ramp structures 46, 48, thereby loading the read/write heads 36 onto the surfaces of the storage media within the cartridge 10.

Pulsed Current Velocity Controlled Head Load/Unload Method

The present invention provides a head load/unload method which uses back EMF to modulate pulse amplitude control of head load velocity in rotating media mass storage applications. More particularly, the present invention provides a pulsed current velocity controlled head load/unload method that uses back EMF to modulate pulse amplitude, without the need to vary pulse width and without the need to convert the back EMF to a digital signal. The provision of a circuit that utilizes a fixed sized pulse train in accordance with the present invention saves circuit overhead relative to a control circuit that applies a variably sized pulse train. The present invention provides a self-contained analog control circuit that makes direct use of the back EMF signal as back EMF is generated by the movement of the coil 43, thereby foregoing the use of an A/D converter as taught by the prior art.

Figure 7:
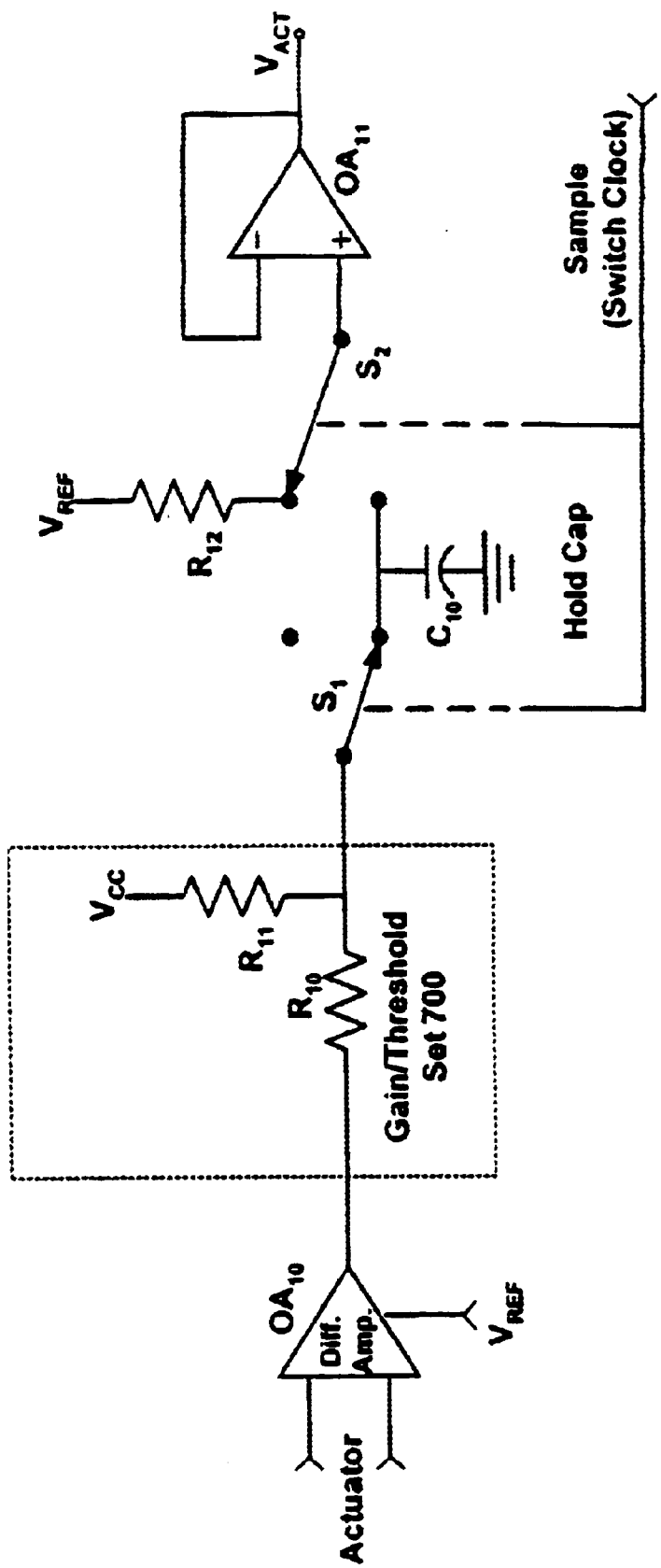
FIG. 7 is a schematic circuit diagram of an illustrative back EMF sensing electronic circuit to realize head loading and unloading functions in accordance with the present invention.

FIG. 7 illustrates a schematic diagram of a self-contained back EMF sensing circuit in accordance with the present invention. The back EMF sensing circuit of the present invention advantageously provides several new improvements vis-à-vis the prior art. The back EMF sensing circuit advantageously uses the back EMF analog signal to modulate pulse amplitude. The invention provides a system having amplitude modulation of a fixed period current pulse train via back EMF feedback, whereby there is no need for A/D circuitry to monitor back EMF.

The circuit of the present invention includes operational amplifiers $OA_{10}$, $OA_{11}$, resistors $R_{10}$, $R_{11}$, $R_{12}$, capacitor $C_{10}$ and switches $S_1$ and $S_2$.

Figure 8:
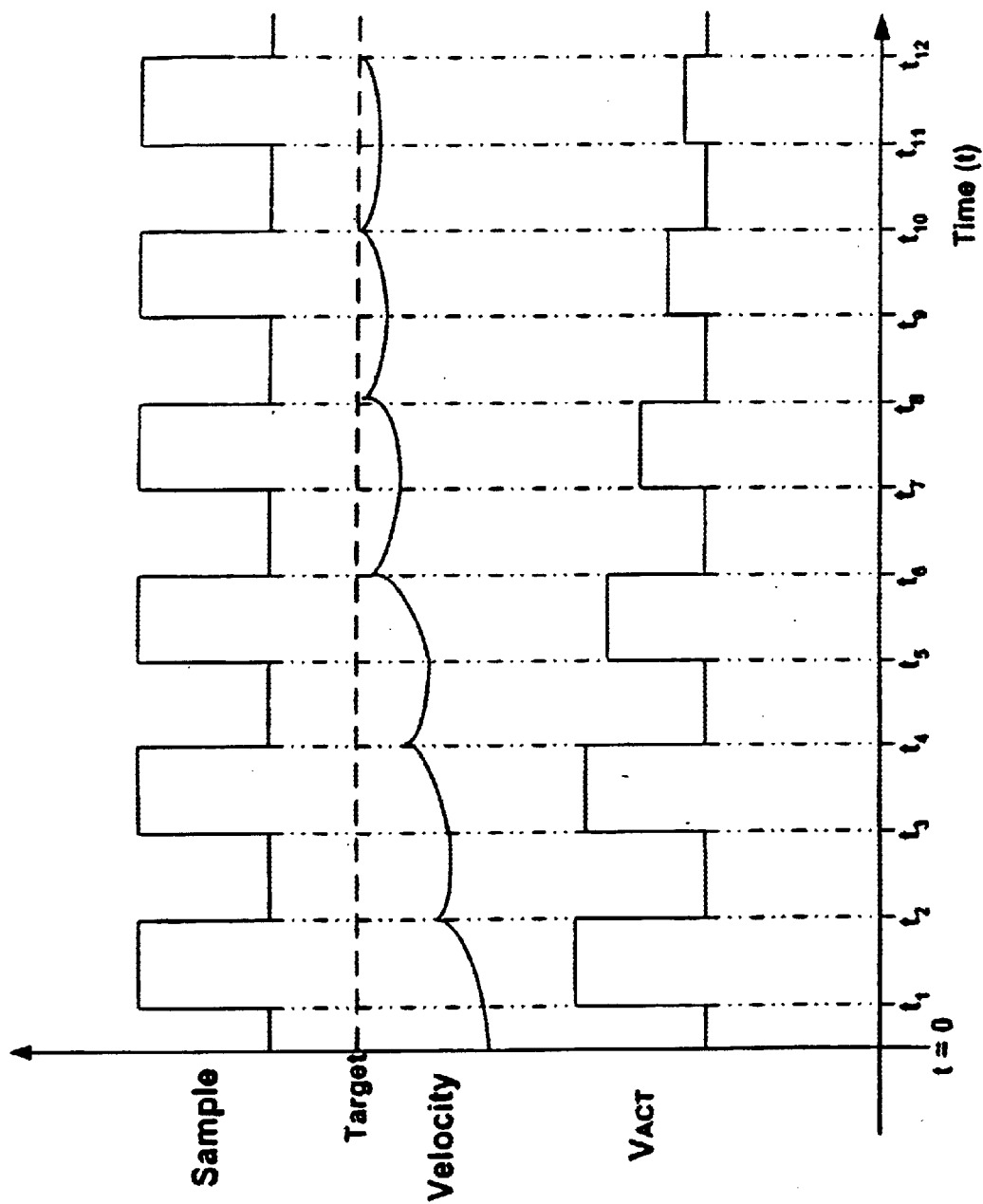
FIG. 8 illustrates Sample, Velocity and $V_{ACT}$ waveforms in connection with the operation of the present invention.

FIG. 8 illustrates exemplary waveforms that are generated in accordance with and illustrative of the operation of the circuit of the present invention. In operation, a fixed period current pulse train, $V_{ACT}$, is applied to a head arm actuator coil in order to gently move the heads off the load ramp and onto the media. Back EMF from the actuator coil during zero commanded current is used to reduce the amplitude of the commanded current pulse train (See $V_{ACT}$) and thereby control the velocity during head load, e.g., by driving the velocity signal to a target level.

Figure 9:
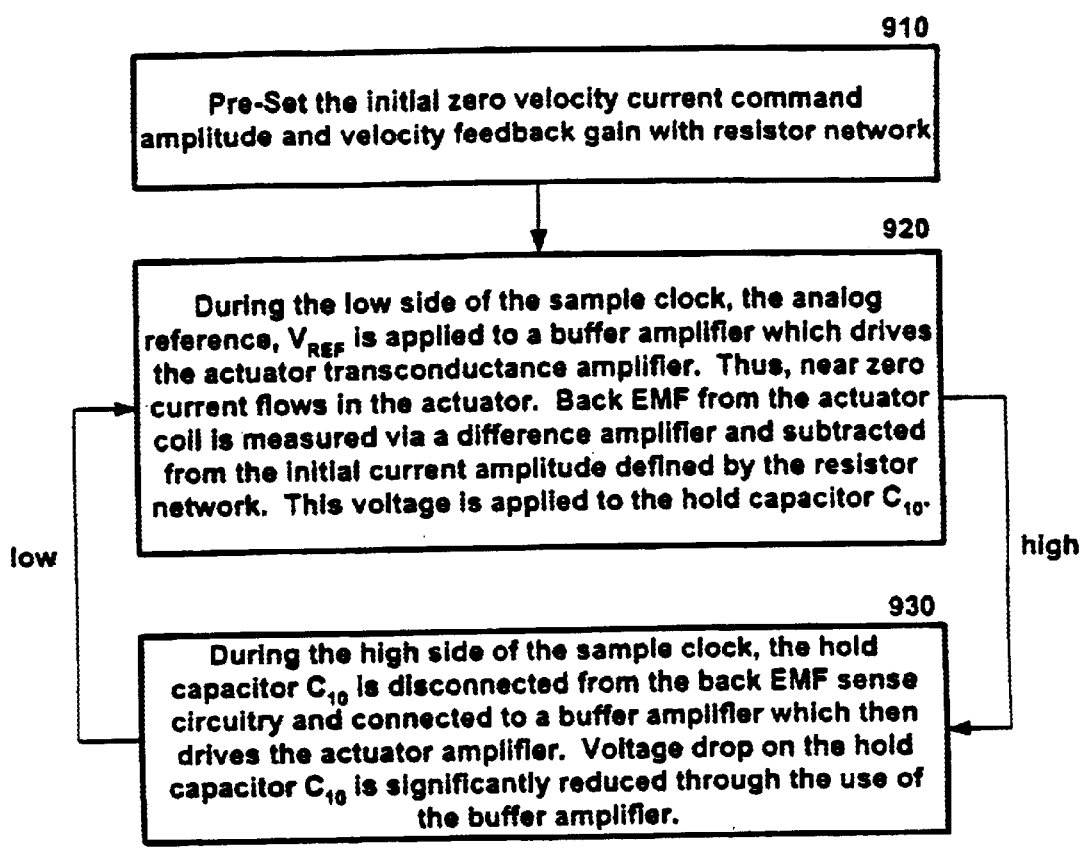
FIG. 9 is a flowchart diagram of a calibration operation performed in connection with the back EMF sensing electronic circuit that realizes head loading and unloading functions in accordance with the present invention.

With additional reference to FIG. 9, at 910, the initial zero velocity current command amplitude and velocity feedback gain is determined by a resistor network represented by the Gain/Threshold Set 700 from FIG. 7.

At 920, during the low side of the sample clock, the analog reference, $V_{REF}$, is applied to a buffer amplifier $OA_{11}$ that drives the actuator transconductance amplifier. Thus, near zero current flows in the actuator. Back EMF from the actuator coil is measured via a difference amplifier $OA_{10}$ and subtracted from the initial current amplitude defined by the resistor network 700. This voltage is applied to hold capacitor $C_{10}$.

At 930, during the high side of the sample clock, the hold capacitor $C_{10}$ is disconnected from the back EMF sense circuitry and connected to a buffer amplifier that then drives the actuator amplifier. Voltage drop on the hold capacitor $C_{10}$ is significantly reduced through the use of the buffer amplifier $OA_{11}$.

Thus, the present invention includes amplitude modulation of a fixed period current pulse train via back EMF feedback and with no corresponding need to monitor back EMF via A/D circuitry because it is a self-contained analog control circuit. As used herein, self-contained refers to the nature of the circuit in that it requires no connection to any microprocessor or other processing element of the storage device and because no digital circuitry, such as analog to digital circuitry, is implicated to process the back EMF signal, but rather the analog back EMF signal is input directly to the circuit, and utilized thereby in formulating the actuator-driving signal.

As the foregoing illustrates, the present invention is directed to methods and apparatus for booting a computer system and loading drivers from a removable media disk drive. In a PC system that boots an operating system from a storage device, the present invention provides a means for booting from a removable media drive. It is understood, however, that changes may be made to the embodiments described above without departing from the broad inventive concepts thereof. For example, while the method of the present invention is particularly well suited to an IDE interfaced removable media drive, the same method may be used to boot a PC system from a removable media drive connected to a different interface, such as SCSI. Furthermore, the invention may be applied to any apparatus for which an improved method of pulsed current velocity controlled head loading is desirable. As one of ordinary skill in the art can appreciate, the techniques of the present invention may also be applied to head unloading. Accordingly, this invention is not limited to the particular embodiments disclosed, but is intended to cover all modifications that are within the scope and spirit of the invention as defined by the appended claims.

What is claimed is:

1. Head loading circuitry for providing closed loop control of head load velocity, comprising:
   a back EMF sensing element;
   a gain/threshold set element electrically connected to the output of said back EMF sensing element;
   a capacitive element that is switchably electrically connected via a first switch to the output of said gain/threshold set element; and
   a buffer element that is switchably electrically connected via a second switch to the output of said capacitive element.

2. Head loading circuitry as recited in claim 1, wherein when said capacitive element is electrically connected via the first switch to the output of said gain/threshold set element, the buffer element is disconnected via the second switch from the output of said capacitive element.

3. Head loading circuitry as recited in claim 1, wherein when the buffer element is connected via the second switch to the output of said capacitive element, said capacitive element is disconnected via the first switch from the output of said gain/threshold set element.

4. Head loading circuitry as recited in claim 1, wherein back EMF from an actuator coil is sensed by said back EMF sensing element.

5. Head loading circuitry as recited in claim 1, wherein the values chosen for resistor elements in said gain/threshold set element determine an initial zero velocity current command amplitude and a velocity feedback gain.

6. Head loading circuitry as recited in claim 1, wherein a sample clock is input to said head loading circuitry.

7. Head loading circuitry as recited in claim 6, wherein said sample clock determines when said first switch switches.

8. Head loading circuitry as recited in claim 6, wherein said sample clock determines when said second switch switches.

9. Head loading circuitry as recited in claim 6, wherein when said sample clock switches from high to low, said first switch is connected to said capacitive element and said second switch is disconnected from said buffer element.

10. Head loading circuitry as recited in claim 6, wherein when said sample clock switches from low to high, said first switch is disconnected from said capacitive element and said second switch is connected to said buffer element.

11. Head loading circuitry as recited in claim 1, wherein the output of said buffer element is utilized to drive at least one of a head load and head unload process.

12. Head loading circuitry as recited in claim 11, wherein the output of said buffer element is a fixed period pulse train that is modulated by a back EMF signal detected by said back EMF sensing element.

13. A method for loading or unloading a head of a storage device via a head load/unload circuit, comprising the acts of:
   inputting a clock signal to the head load/unload circuit;
   sensing an analog back EMF signal with said circuit;
   charging a capacitive element in accordance with said back EMF signal and clock signal and discharging the capacitive element in accordance with said clock signal; and
   outputting an actuator-driving signal from said circuit that drives an actuator arm to a target velocity.

14. A method according to claim 13, wherein said outputting of an actuator-driving signal includes outputting a fixed period pulse train modulated via said back EMF signal as reflected by said capacitive element during said charging.

15. A method according to claim 13, wherein said charging includes switching a first switch, thereby connecting the capacitive element to the sensed back EMF signal and switching a second switch, thereby disconnecting the capacitive element from a buffer element.

16. A method according to claim 15, wherein said switching of said first and second switches includes switching the first and second switches when said clock signal transitions from high to low.

17. A method according to claim 15, wherein said sensing of said back EMF signal includes inputting the back EMF signal into a differential amplifier.

18. A method according to claim 17, wherein the output of the differential amplifier is input to a resistor network, wherein the values chosen for resistor elements in said resistor network determine an initial zero velocity current command amplitude and a velocity feedback gain.

19. A method according to claim 15, wherein said discharging includes switching the first switch, thereby disconnecting the capacitive element from the sensed back EMF signal and switching the second switch, thereby connecting the capacitive element to a buffer element.

20. A method according to claim 19, wherein said switching of said first and second switches includes switching the first and second switches when said clock signal transitions from low to high.

21. A method according to claim 19, wherein the output of the capacitive element is input to a buffer element, and said outputting of the actuator-driving signal includes outputting the output of said buffer element.

22. A method according to claim 17, wherein the output of the differential amplifier is input to a resistor network, wherein the values chosen for resistor elements in said resistor network determine an initial zero velocity current command amplitude and a velocity feedback gain.

23. A method for loading or unloading a head of a storage device via a head load/unload circuit, comprising the acts of:
   pre-setting an initial zero velocity current command amplitude and velocity feedback gain of the circuit by selecting appropriate values for resistor elements in a resistor network;
   inputting a sample clock to the circuit;
   receiving an analog back EMF signal by the circuit, said back EMF generated by an actuator coil;
   during the low cycle of the sample clock, applying the back EMF voltage to a differential amplifier and the resistor network, and charging a capacitive element with the output from said resistor network;
   during the high cycle of the sample clock, applying the charge of the capacitive element to a buffer element; and
   outputting from the buffer element a signal that drives an actuator arm to a target velocity.

24. The method according to claim 23, wherein during the low cycle of the sample clock, the capacitive element is disconnected from the buffer element and during the high cycle of the sample clock, the output of the resistor network is disconnected from the capacitive element.

25. The method according to claim 24, wherein said capacitive element is connected and disconnected from said output of the resistor network and said buffer element via at least one switch.

* * * * *